United States Patent [19]

Neumann

[11] 4,163,430

[45] Aug. 7, 1979

[54] HEAT RECOVERY AND FILTER SYSTEM AND PROCESS FOR FURNACE EXHAUST GASES

[76] Inventor: Siegmar R. Neumann, Julius-Leber-Str. 10, 8070 Ingolstadt, Fed. Rep. of Germany

[21] Appl. No.: 876,144

[22] Filed: Feb. 8, 1978

[51] Int. Cl.$^2$ .............................................. F22B 33/00
[52] U.S. Cl. .................................. 122/20 B; 110/119; 122/412
[58] Field of Search .............. 110/119; 122/20 B, 421, 122/412

[56] References Cited

U.S. PATENT DOCUMENTS

| | | | |
|---|---|---|---|
| 597,727 | 1/1898 | Maloney | 122/421 |
| 1,063,130 | 5/1913 | Leslie | 110/119 |
| 1,802,023 | 4/1931 | Kreft | 122/20 |
| 1,892,188 | 12/1932 | Goodridge | 122/20 |
| 2,537,558 | 1/1951 | Tigges | 122/421 |
| 3,896,992 | 7/1975 | Borovina et al. | 122/20 |
| 4,120,267 | 10/1978 | Wood | 122/20 |

*Primary Examiner*—Kenneth W. Sprague
*Attorney, Agent, or Firm*—Schwartz & Weinrieb

[57] ABSTRACT

A heat exchanger is interposed between the exhaust duct of a water boiler and the chimney or flue, and a water conduit, connected to the water return line of the heating system, is disposed within the heat exchanger in heat exchange relationship with the exhaust gases. In this manner, up to 85% of the thermal energy within the exhaust gases is recovered and imparted to the water for pre-heating the same prior to the transmission of the pre-heated water into the boiler for additional heating, or alternatively, directly into the water heating system. A filter assembly is preferably interposed between the heat exchanger and the chimney or flue so as to filter the cooled gases prior to the emission of the same into the atmosphere. As a result, solid particles, and a substantial portion of sulfur dioxide, is removed from the exhaust gases so as to reduce pollution conditions.

10 Claims, 2 Drawing Figures

HEAT RECOVERY AND FILTER SYSTEM AND PROCESS FOR FURNACE EXHAUST GASES

FIELD OF THE INVENTION

The present invention relates generally to a process and apparatus for recovering heat energy from combustion exhaust gases and for filtering the exhaust gases, and more particularly to a process and apparatus for recovering heat energy from combustion exhaust gases generated within centralized water heating systems, and for filtering the exhaust gases prior to the emission of the same into the atmosphere.

BACKGROUND OF THE INVENTION

As is well-known and appreciated, a tremendous amount of energy, particularly in the form of light heating fuel oil, is consumed for home heating purposes, and as a result of the combustion process of such fuel oils, the environment has been polluted, in part, by the residue products of such fuel combustion. It is also known that the temperature of the exhaust fumes must be maintained at a minimum level of approximately 70° C. or 158° F. at the end discharge point or chimney in order to prevent solidification of exhaust gas components and the resulting fouling of the exhaust system. The exhaust gases discharged from such fuel furnaces into the exhaust systems and chimneys have therefore been conventionally characterized by temperature levels of between 180° C.–350° C. or 356° F.–662° F. It is readily appreciated that a considerable amount of heat or thermal energy is contained within these exhaust gases, and consequently, when such energy is permitted to be readily discharged into the atmosphere, a great amount of potential energy is lost and wasted.

A multitude of devices have been developed in an attempt to recover the heat energy of the exhaust gases, however, for one reason or another, such devices have not been commercially acceptable. In accordance with one such device, the exhaust fumes are conducted through the water to be heated and utilized within the central heating system. The heat is effectively withdrawn and recovered from the exhaust gases, and the water effectively heated thereby, however, it has also been observed that the humidity content of the exhaust gases is drastically increased as a result of its direct contact with the water, and as a result, increased soot deposits within the chimney components are developed. In addition, this particular type of device can only be utilized in conjunction with gas-fired furnaces, as fuel oils and coal will cause solid residues, as well as sulfur dioxide, to accumulate within the water system. The sulfur dioxide will, of course, also serve to produce sulfurous acid which, of course, is a particularly harmful or deleterious substance.

In accordance with another device developed within recent years, a water jacket surrounds the exhaust duct, and a plurality of apertures fluidically connect the duct with the water jacket such that the water within the jacket is indirectly heated by the thermal energy within the exhaust gases. It has been found, however, that the fluid contact areas, defined by the fluid volume permitted to flow through the duct apertures, are too limited, and consequently, the temperature of the exhaust gases is not lowered to an appreciable degree. Concomitantly, an insufficient amount of heat energy is recovered and transferred to the water in order to appreciably heat or pre-heat the same within the heating system, and still further, such a system does not serve to rectify the pollution problems.

OBJECTS OF THE INVENTION

Accordingly, it is an object of the present invention to provide a new and improved process and apparatus for recovering heat energy from combustion exhaust gases generated within a centralized heating system, and for filtering the exhaust gases prior to the emission thereof into the atmosphere.

Another object of the present invention is to provide a new and improved process and apparatus of the aforenoted type which can be adapted to all types of centralized heating systems which utilize combustible materials as their heating sources.

Still another object of the present invention is to provide a new and improved process and apparatus of the aforenoted type which can be adapted to existing heating installations.

Yet another object of the present invention is to provide a new and improved process and apparatus of the aforenoted type which will recover approximately 85% of the thermal energy present within the exhaust gases so as to appreciably conserve energy and available natural resources.

Still yet another object of the present invention is to provide a new and improved process and apparatus of the aforenoted type which will filter the exhaust gases and thereby appreciably reduce air pollution.

Yet still another object of the present invention is to provide a new and improved process and apparatus of the aforenoted type which is relatively inexpensive to incorporate within conventional heating systems.

A further object of the present invention is to provide a new and improved process and apparatus of the aforenoted type which substantially increases the operating efficiency of the conventional systems within which it is incorporated.

A still further object of the present invention is to provide a new and improved process and apparatus of the aforenoted type which is relatively simple to incorporate into conventional heating systems.

A yet further object of the present invention is to provide a new and improved process and apparatus of the aforenoted type which is readily accessible and easy to clean and maintain.

SUMMARY OF THE INVENTION

The foregoing and other objects are achieved in accordance with the present invention through the provision of apparatus which is interposed between the exhaust duct of the furnace and the exhaust flue or chimney. The apparatus comprises a heat exchanger which has one end thereof operatively connected to the exhaust duct of the furnace or boiler so as to receive the exhaust gases therefrom, and a water conduit is disposed with the heat exchanger. The exhaust gases and the water conduit are disposed in a heat exchange relationship, and in this manner, the return water being conducted back to the boiler or furnace is pre-heated by means of the exhaust gases while the latter are substantially cooled for emission into the atmosphere.

A filter bank is operatively connected to the other end of the heat exchanger through means of an auxiliary duct, and an exhaust fan is preferably disposed within the downstream end of the filter bank for drawing the cooled exhaust gases therethrough and for discharging the same through the chimney or flue and into the atmosphere. In this manner, solid particles, as well as a substantial portion of the sulfur dioxide generated during the combustion process, is removed prior to the emission of the exhaust gases into the atmosphere.

BRIEF DESCRIPTION OF THE DRAWINGS

Various other objects, features, and attendant advantages of the present invention will be more fully appreciated as the same becomes better understood from the following detailed description, when considered in conjunction with the accompanying drawings in which like reference characters designate like or corresponding parts throughout the several views, and wherein.

DETAILED DESCRIPTION OF THE PREFERRED EMBODIMENT

Figure 1:
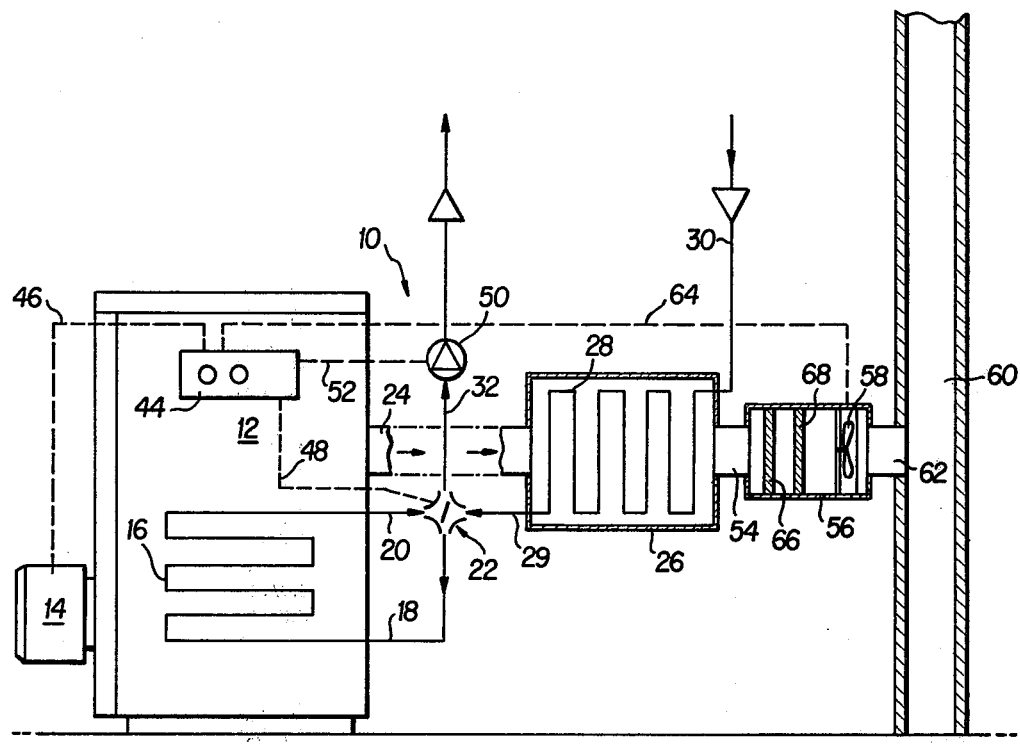
FIG. 1 is a schematic view of heating system apparatus constructed in accordance with the present invention and adapted to carry out the process of the present invention.

Referring now to the drawings, and more particularly to FIG. 1 thereof, the apparatus of the present invention is generally indicated by the reference character 10 and is seen to include a hot air furnace or water boiler 12 depending upon the fluid medium to be utilized within the heating system of the edifice with which the furnace or boiler is operatively associated. Moreover, the furnace or boiler 12 may utilize natural gas, fuel oil, coal, or the like, as its combustible material, and a burner or combustion chamber 14 is seen to be fixedly mounted upon one side thereof. Merely as an exemplary matter, the remaining description of the present invention will be directed to a hot water heating system, although, as noted hereinabove, the present invention is likewise adapted to be utilized within hot air type heating systems.

A hot water conduit 16 is disposed within a boiler 12 so as to be heated by means of the products of combustion generated by means of burner 14, and in order to increase the heating efficiency of the burner 14 with respect to the water circulated through conduit 16, it is noted that the latter is preferably disposed in a serpentine fashion according to a preferred embodiment of this invention. The ends of conduit 16 are integrally connected to a water inlet line 18 and a water outlet line 20, and as will be discussed more fully hereinafter, lines 18 and 20 are suitably fluidically connected to a four-port mixing valve generally indicated by the reference character 22.

The products of combustion or exhaust gases of boiler 12 are exhausted therefrom by means of an exhaust duct 24 fluidically connected to the side of boiler 12 opposite that side upon which burner 14 is mounted, and the free end of duct 24 is fluidically connected with a heat exchanger 26 so as to conduct the exhaust gases thereinto. Another water conduit 28 is disposed with heat exchanger 26 in a manner similar to the disposition of conduit 16 within boiler 12 such that a heat exchange relationship is defined between conduit 28, and the water circulating therethrough, and the exhaust gases flowing through the heat exchanger 26. In order to increase the heat exchange efficiency, it is noted that conduit 28 is preferably disposed in a serpentine fashion similar to that of conduit 16 although it is not necessary for said conduit 28 to be disposed in a serpentine manner for the practice of this invention.

The upstream end of conduit 28 is integrally connected with a water-return conduit 30 fluidically connected to the water heating system, not shown, of the particular edifice within which the apparatus 10 is disposed, while the downstream end of conduit 28 is integrally connected to another conduit 29 which, in turn, is connected to a third port of mixing valve 22. The fourth port of valve 22 is fluidically connected to a water-supply conduit 32 which is, in turn, also fluidically connected to the edifice water heating system.

The temperature of the exhaust gases flowing through exhaust duct 24 typically has a value within the range of 200° C.–350° C., or 392° F.–662° F., and it has been observed that after passing through heat exchanger 26, the temperature of the exhaust gases has been reduced to approximately 150° F. It is therefore to be appreciated that approximately 70–80%, and sometimes even as high as 85%, of the thermal energy present within the exhaust gases has been recovered and transferred to the water circulated through conduit 28 so as to pre-heat the same prior to the supply thereof into the boiler water intake line 18 and/or supply line 32.

Figure 2:
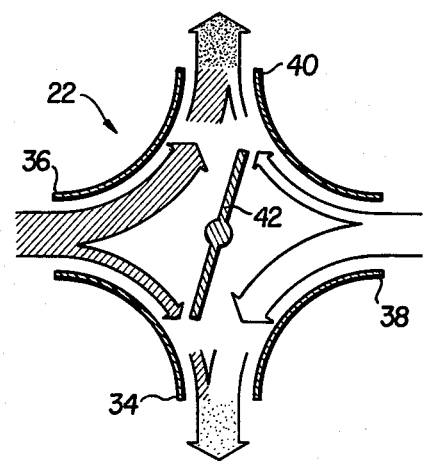
FIG. 2 is a schematic view of a mixing valve employed within the apparatus of FIG. 1.

With particular reference being made to FIG. 2, an appreciation of the structure and operation of mixing valve 22 will be gained. As is readily apparent from the FIGURE, the mixing valve 22 is a four-port type mixing valve with the ports 34, 36, 38, and 40 being respectively connected to fluid conduits 18, 20, 29, and 32. A valve plate or damper 42 is rotatably disposed interiorly of valve 22 for controlling the flow patterns therethrough, and it is to be noted that damper 42 may be manually controlled or automatically controlled as desired. As is readily apparent from the FIGURE, the selective control of damper 42 permits the volume of pre-heated water flowing thereinto from conduit 29 to be controlled in such a manner that a predetermined quantity of such pre-heated water flows either into water inlet line 18 or, alternatively, directly into the water supply conduit 32. In a likewise manner, the water heated by boiler 12 is conducted into valve 22 through means of port 36, and as a result of the disposition of damper 42, a predetermined portion of such heated water is either recycled back into inlet line 18 through means of port 34, or conducted into water supply conduit 32 through means of port 40.

When damper 42 is manually controlled, a suitable handle mechanism, not shown, may be disposed exteriorly of the valve housing and suitably connected to the damper, and during operation of the system, a preselected setting of the damper will probably be maintained. A more preferable arrangement, however, would be one wherein damper 42 is automatically controlled in conjunction with the operation of boiler 12. An electrical control panel is disclosed in FIG. 1 at 44, and it is seen that burner 14 is electrically connected thereto by means of electrical line 46. It is to be understood that the heating system is thermostatically controlled in a conventional manner, and when valve 22 is automatically controlled, the same may be electrically connected to panel 44 by means of electrical line 48. Consequently, it may be appreciated that when a heating cycle commences, and burner 14 is initially energized, the exhaust gases therefrom will be conducted into heat exchanger 26 for pre-heating the water circulated therethrough, and in order to minimize the time required to bring the temperature of the water within boiler 12 up to the predetermined level for accomplishing heating of the edifice, the damper 42 of valve 22 may be automatically disposed in such a position that substantially all of the pre-heated water from heat exchanger 26 is conducted directly into boiler 12 through means of port 34 and inlet line 18. As the heating process continues, the damper 42 may be moved to other pre-determined positions whereby a pre-selected portion of the pre-heated water is conducted to boiler 12 while the remaining portion is conducted directly into supply line 32. In order to circulate the heated water throughout the heating system of the edifice, a suitable pump 50 is disposed within supply line 32, and it is likewise to be appreciated that pump 50 is suitably thermostatically controlled, in conjunction with burner 14, through means of electrical control panel 44 and electrical line 52.

With reference again being made to FIG. 1, it is seen that the other end of heat exchanger 26 is fluidically connected with an auxiliary exhaust duct 54 for removing the cooled exhaust gases therefrom, and the downstream end of duct 54 is, in turn, fluidically connected with a filter assembly or housing 56. Heat exchanger 26 is suitably insulated in order to prevent heat losses therefrom and the lowering of its heat exchange efficiency, and in order to protect the same from any possible corrosive effects of the exhaust gases, the interior surfaces of heat exchanger 26 are suitably coated with heat resistive, non-corrosive materials. The interior of filter housing 56 is likewise protected, and a fan 58 is disposed within the downstream end of housing 56 in order to provide a sufficient draft of the exhaust gases through the heat exchanger 26 and filter housing 56. The discharged exhaust gases are of course conducted into chimney 60 through means of another auxiliary exhaust duct 62 interposed between the chimney 60 and the downstream end of filter housing 56. Fan 58 is electrically connected to electrical control panel 44 through means of electrical line 64, and the electrical circuitry is such that fan 58 is energized at the same time that energization of burner 14 occurs. In this manner, the exhaust gases may be removed from the system as they are generated so as to thereby avoid any back-pressure or choking effects. A suitable relay mechanism may also be incorporated within the circuitry so as to continue the operation of fan 58 subsequent to the deenergization of burner 14 and for a predetermined period of time in order to assure that all exhaust gases have been eliminated or discharged from the system.

Interposed between fan 58 and auxiliary duct 54 is a pair of filters 66 and 68 which are respectively coarse and fine filter elements. The filters may be of the replaceable or disposable type, or alternatively, of the type that may be removed, cleaned, and re-inserted into the system. It has been observed that as a result of the employment of such filter elements, almost all of all solid particulate matter within the exhaust gases is removed therefrom, and approximately 40–85% of the sulfur dioxide present within the exhaust gases may be removed therefrom. Depending upon the type of fuel employed within burner 14, the filters may employ activated charcoal compositions therein. The size of the filter assembly may be pre-selected in accordance with the size of the edifice being serviced and the heating system employed therein, and similarly for the size of the heat exchanger apparatus.

Still further, it is also to be appreciated that while the heat exchanger apparatus and the filter assembly have been illustrated as being disposed in a substantially coaxial arrangement, such is dictated by the space available between the boiler 12 and the chimney 60. If space is limited, for example, then, in lieu of rectilinear, horizontally disposed exhaust ducts 24, 54, and 62, various elbow-shaped ducts may be employed.

Although exhaust fan 58 is preferably disposed between filters 66 and 68, and chimney 60, as illustrated in FIG. 1, fan 58 can also be positioned between said filters 66 and 68, and heat exchanger 26 or said fan 58 can be located within chimney 60.

It may thus be seen that the apparatus and process of the present invention have important advantages over known prior art systems and processes in that an appreciable amount of thermal or heat energy is recovered from the combustion exhaust gases and recycled into the water-heating system so as to conserve fuel energy normally utilized for heating the water. Up to 85% of the thermal energy has been observed to have been recovered. Concomitantly, the cooling of the exhaust gases has likewise been observed to have positive results in eliminating or minimizing the establishment of "heat domes" above metropolitan areas, and the improvement in urban climatic conditions in general. Still further, as a result of the filtering of the exhaust gases, solid particles have been removed so as to again eliminate or reduce smog conditions, and in addition, the removal of substantial amounts of sulfur dioxide likewise diminishes potential damage to urban property and human beings which conventionally occurs through the formation of sulfurous acid.

Obviously, many modifications and variations of the present invention are possible in light of the teachings noted hereinabove. It is therefore to be understood that within the scope of the appended claims, the present invention may be practiced otherwise than as specifically described herein.

What is claimed as new and desired to be secured by Letters Patent of the United States is:

1. Heating system apparatus in combination with means for heating a fluid medium by combustible material, said apparatus comprising:
   means for supplying said fluid medium from said heating means to an installation to be heated, and for returning said fluid medium from said installation to said heating means;
   heat exchange means operatively connected to said heating means and said fluid medium return means for recovering the thermal energy within the exhaust gases of said combustible materials and transferring said thermal energy to said fluid medium so as to pre-heat said fluid medium prior to the introduction of said fluid medium into said supply means;
   filter means interposed between said heat exchange means and an atmospheric exhaust means of said installation for filtering said cooled exhaust gases prior to the discharge of said exhaust gases into the atmosphere, said filter means comprising fan means for drawing said exhaust gases through said filter means and for discharging said exhuast gases into said atmospheric exhaust means; and
   means for energizing said fan means simultaneously with the energization of said heating means so as to remove said exhaust gases from the system as said exhaust gases are generated, and for de-energizing said fan means subsequent to the de-energization of said heating means so as to insure the removal of all exhaust gases from said system.

2. The apparatus as set forth in claim 1, wherein: said heat exchange means includes a fluid medium conduit disposed therein.

3. The apparatus as set forth in claim 1, further comprising:
mixing valve means interposed between, and operatively connected to, said heating means, said heat exchange means, and said fluid supply and return means, for controlling the volume of said fluid medium conducted through said supply and return means from said heating and heat exchange means.

4. The apparatus as set forth in claim 1, wherein: said filter means comprises coarse and fine filter elements.

5. The apparatus as set forth in claim 1, wherein: said fluid medium is air.

6. The apparatus as set forth in claim 1, wherein: said fluid medium is water.

7. Heating system apparatus in combination with means for heating a fluid medium by combustible material, said apparatus comprising:
means for supplying said fluid medium from said heating means to an installation to be heated, and for returning said fluid medium from said installation to said heating means;
heat exchange means operatively connected to said heating means and said fluid medium return means for recovering the thermal energy within the exhaust gases of said combustible materials and transferring said thermal energy to said fluid medium so as to pre-heat said fluid medium prior to the introduction of said fluid medium into said supply means;
fan means for drawing said exhaust gases from said heat exchange means and for discharging said exhaust gases into said atmospheric exhaust means; and
means for energizing said fan means simultaneously with the energization of said heating means so as to remove said exhaust gases from the system as said exhaust gases are generated, and for de-energizing said fan means subsequent to the de-energization of said heating means so as to insure the removal of all exhaust gases from said system.

8. In a process of heating an installation wherien a heated fluid medium produced by burning a combustible material is conducted through said installation so as to heat said installation, said process comprising:
returning said fluid medium for additional heating by said burning combustible material;
conducting said returning fluid medium through a heat exchange relationship with the gases produced from said burned combustible materials so as to recover the thermal energy from said gases and to transfer said recovered thermal energy to said fluid medium for pre-heating said fluid medium prior to said additional heating there; and simultaneously
increasing the up-draft of said cooled gases in a heat-exchange relationship with said fluid medium thereby resulting in the exhausting of said substantially cooled gases into the atmosphere.

9. The process as set forth in claim 8 wherein: said fluid medium is conducted through said heat exchange relationship in a manner so as to maximize the heat exchange process with said gases.

10. The process as set forth in claim 8, further comprising:
filtering said gases subsequent to said heat exchange process so as to remove pollutants from said gases prior to the discharge of said exhaust gases into the atmosphere.

* * * * *